United States Patent
Ginetti et al.

(10) Patent No.: US 6,170,080 B1
(45) Date of Patent: Jan. 2, 2001

(54) METHOD AND SYSTEM FOR FLOORPLANNING A CIRCUIT DESIGN AT A HIGH LEVEL OF ABSTRACTION

(75) Inventors: Arnold Ginetti, Antibes; Gerrard Tarroux, Villeneuve Loubet; Francois Silve, Mouamf-Sartoux; Jean-Michel Fernandes, Antibes, all of (FR); Philippe Troin, Milpitas; Jean-Charles Giomi, Woodside, both of CA (US)

(73) Assignee: VLSI Technology, Inc., San Jose, CA (US)

( * ) Notice: Under 35 U.S.C. 154(b), the term of this patent shall be extended for 0 days.

(21) Appl. No.: 08/921,361

(22) Filed: Aug. 29, 1997

(51) Int. Cl.$^7$ ........................................... G06F 17/50
(52) U.S. Cl. ................................ 716/18; 716/8
(58) Field of Search ................... 364/488, 489, 364/490, 491, 900; 395/600; 716/1, 2, 3, 8, 9, 10, 11, 18

(56) References Cited

U.S. PATENT DOCUMENTS

| | | | |
|---|---|---|---|
| 4,813,013 | * 3/1989 | Dunn | 364/900 |
| 5,113,451 | 5/1992 | Chapman et al. | |
| 5,133,069 | 7/1992 | Asato et al. | |
| 5,187,784 | 2/1993 | Rowson . | |
| 5,308,798 | 5/1994 | Brasen et al. | |
| 5,407,785 | 4/1995 | Leroux . | |
| 5,487,018 | * 1/1996 | Loos et al. | 364/489 |
| 5,493,508 | * 2/1996 | Dangelo et al. | 364/489 |
| 5,526,517 | * 6/1996 | Jones et al. | 395/600 |
| 5,555,201 | * 9/1996 | Dangelo et al. | 364/489 |
| 5,572,437 | * 11/1996 | Rostoker et al. | 364/489 |
| 5,629,860 | * 5/1997 | Jones et al. | 364/490 |
| 5,812,416 | * 9/1998 | Gupte et al. | 364/490 |
| 5,867,399 | * 2/1999 | Rostoker et al. | 364/489 |
| 5,956,497 | * 9/1999 | Ratzel et al. | 395/500.02 |
| 5,984,510 | * 11/1999 | Guruswamy et al. | 364/491 |

OTHER PUBLICATIONS

Glasmacher, Klaus and Zimmermann, Gerhard, "Chip Assembly in the Playout VLSI Design System," IEEE p. 215–221, 1992.*

* cited by examiner

Primary Examiner—Paul R. Lintz
Assistant Examiner—Leigh Marie Garbowski
(74) Attorney, Agent, or Firm—Burns, Doane, Swecker & Mathis L.L.P.

(57) ABSTRACT

A method and a system implement a circuit design in an integrated chip. A floorplan of the circuit design is arranged at a high level of abstraction. The design is synthesized based on the floorplan, and the synthesized design is laid out physically on the integrated circuit.

24 Claims, 7 Drawing Sheets

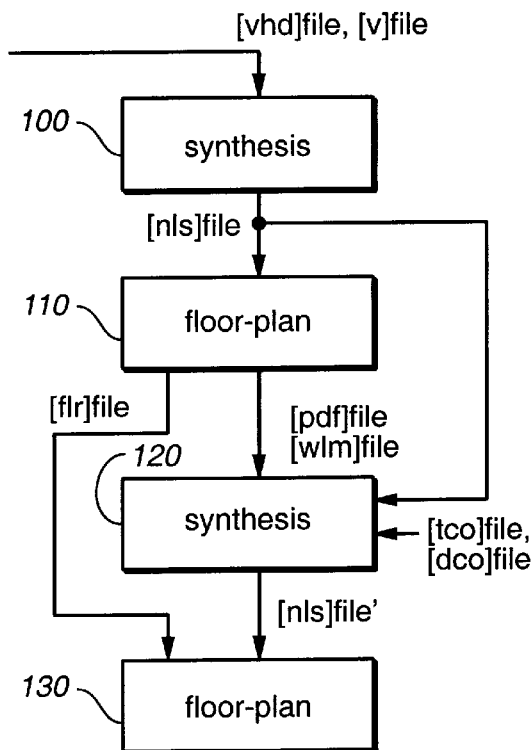
FIG._1a
*(PRIOR ART)*
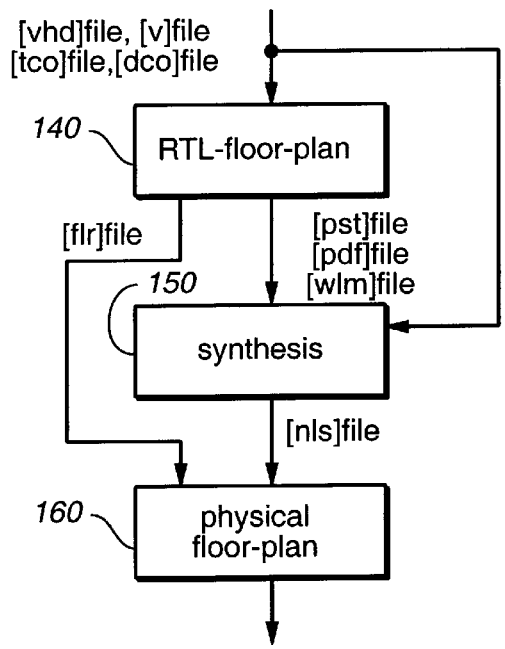
FIG._1b
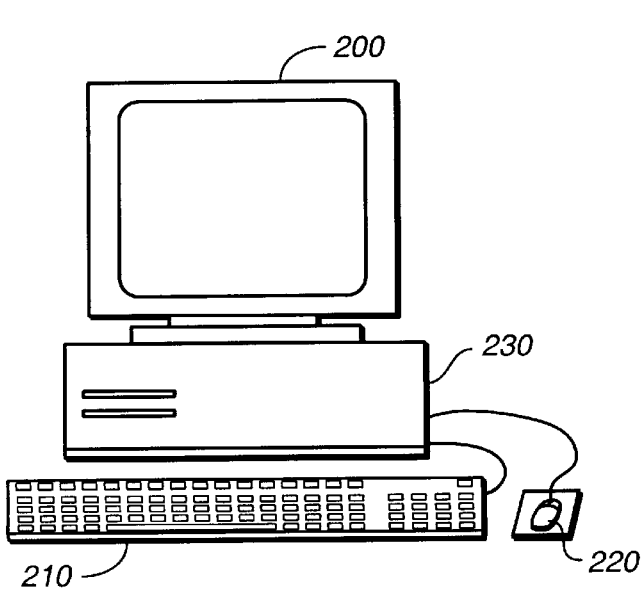
FIG._1c
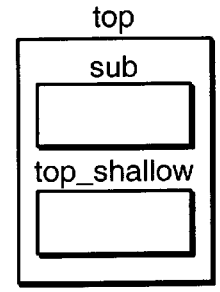
FIG._2a
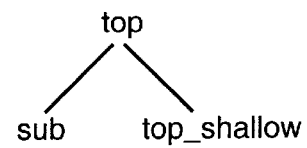
FIG._2b

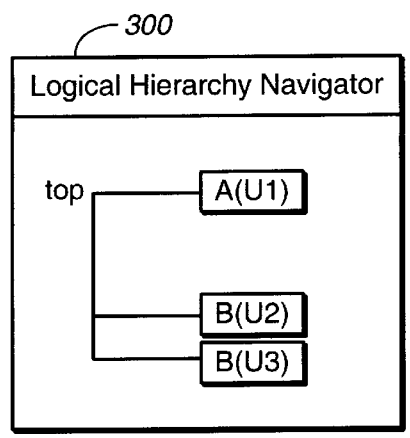
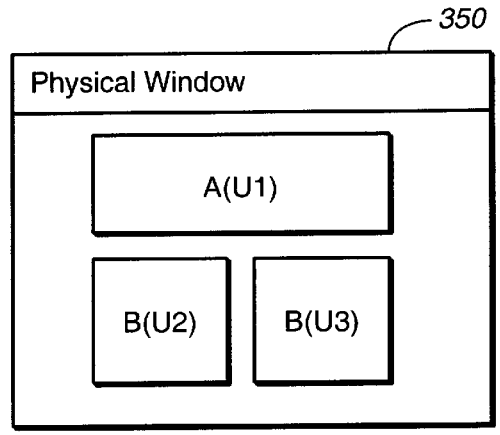
FIG._3a  FIG._3b
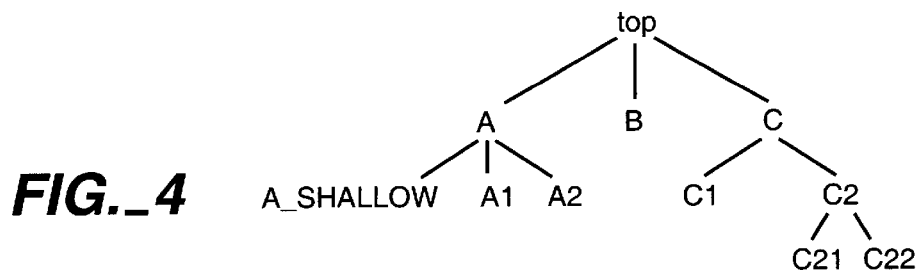
FIG._4
  
FIG._5a  FIG._5b  FIG._5c
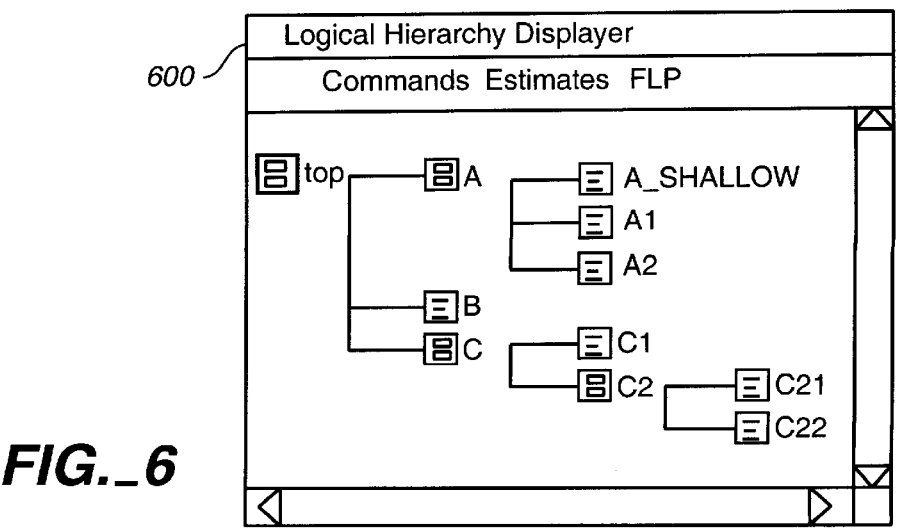
FIG._6

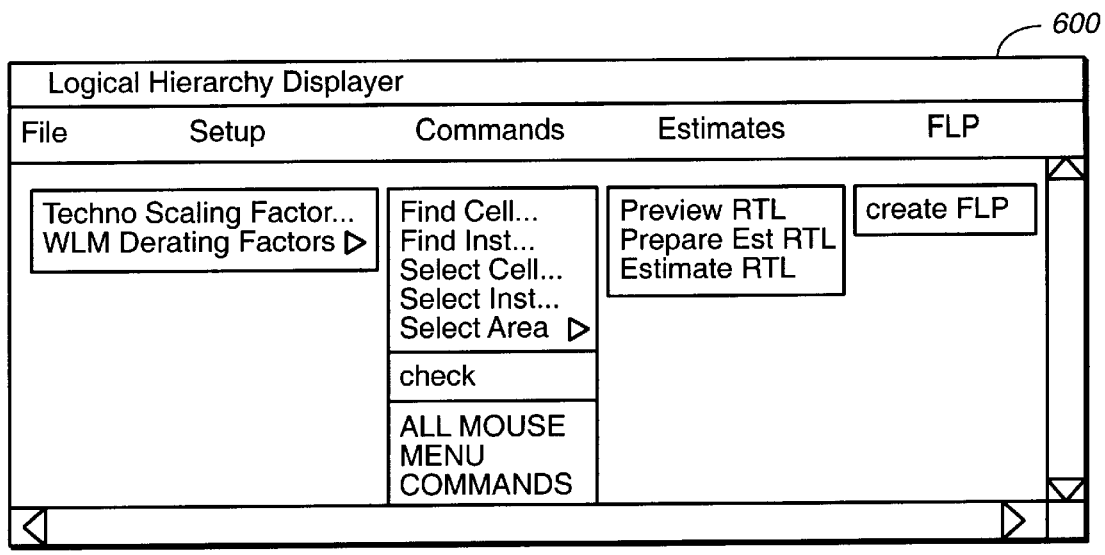
FIG._7a
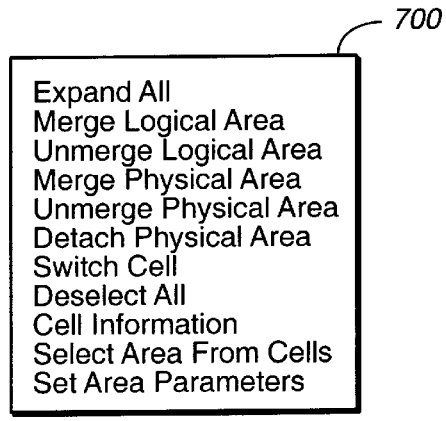
FIG._7b
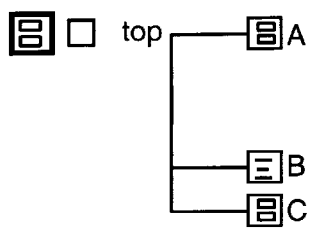
FIG._8a
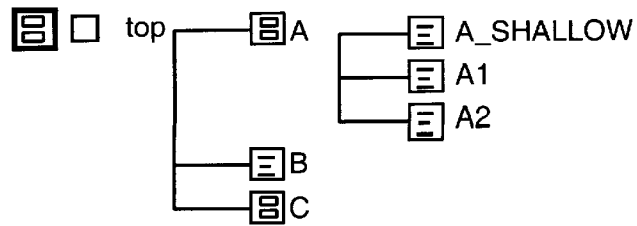
FIG._8b

Area Attribute
- Area Name: area 1
- Area Color: Default
- Area Mode: Estimated
- Area Merged Cells: none
Estimated
- Minimum Ratio: .1
- Maximum Ratio: 10
- Factor: 1.
- Value: N/A
Specified Gate Equivalent
- Value: 2500
- Minimum Ratio: .1
- Maximum Ratio: 10.
Specified Size
- X: 245
- Y: 325
*FIG._9*
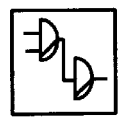
*FIG._10a*
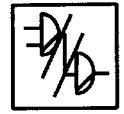
*FIG._10b*
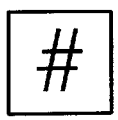
*FIG._10c*
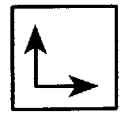
*FIG._10d*

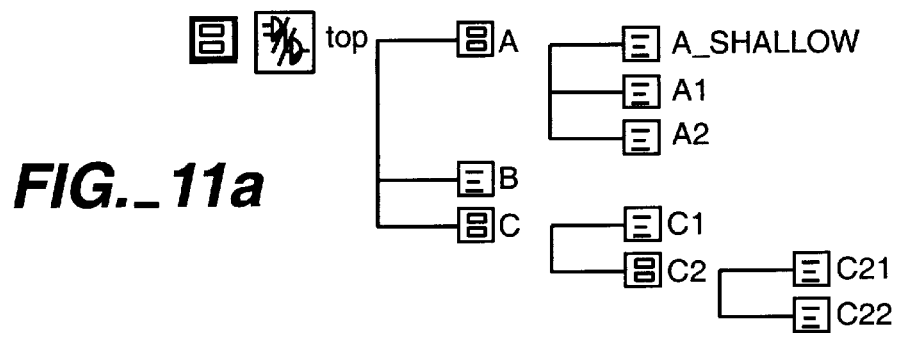
FIG._11a
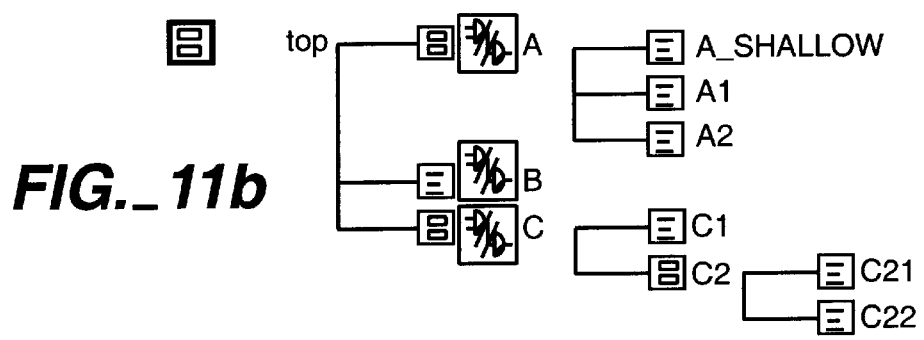
FIG._11b
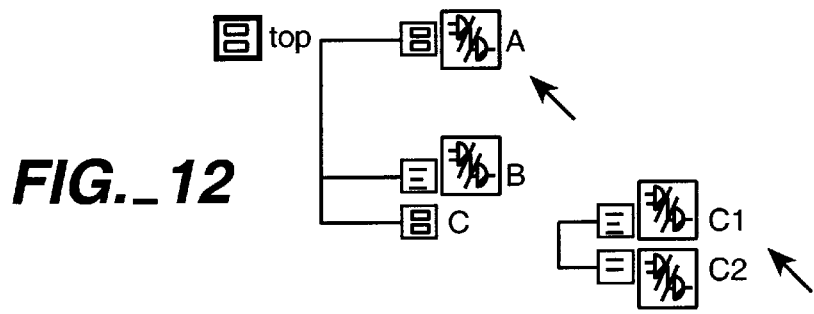
FIG._12
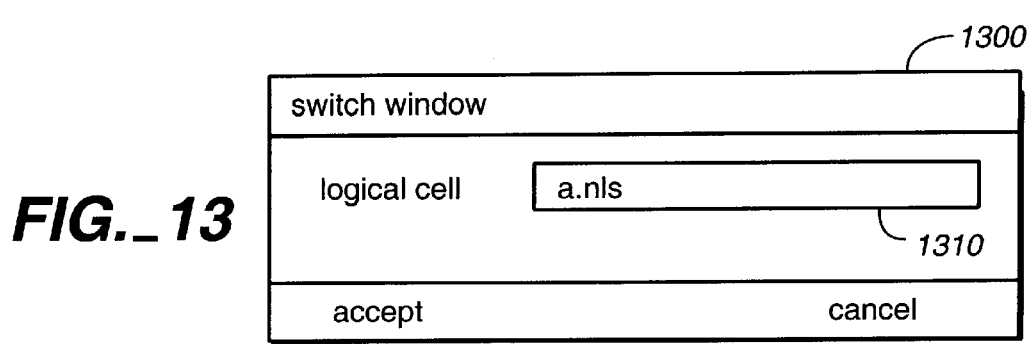
FIG._13

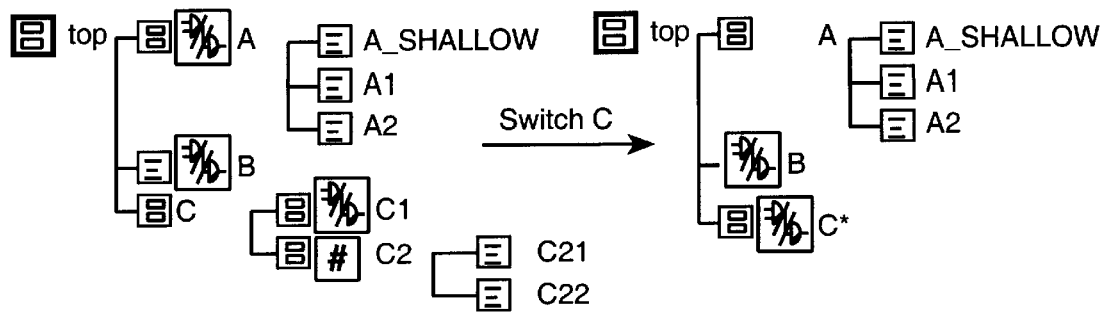
FIG._14
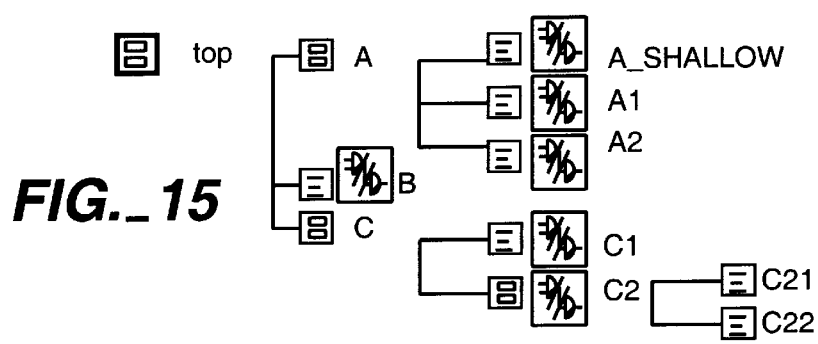
FIG._15
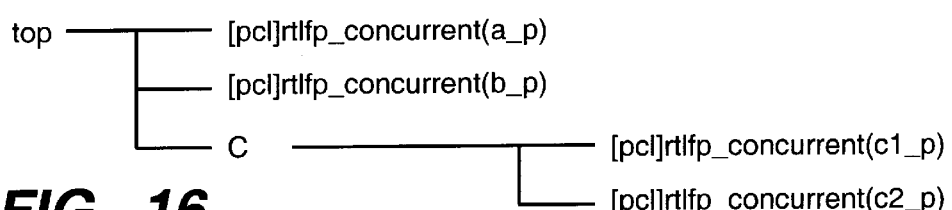
FIG._16
FIG._17
| Cell Information | |
|---|---|
| Cell Name | core |
| Inst Name | u4.u7.u9 |
| Estimated Gate Equiv | 5256 |
1700

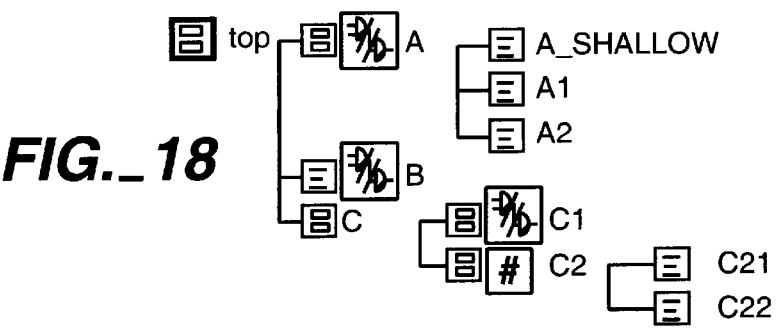
FIG._18
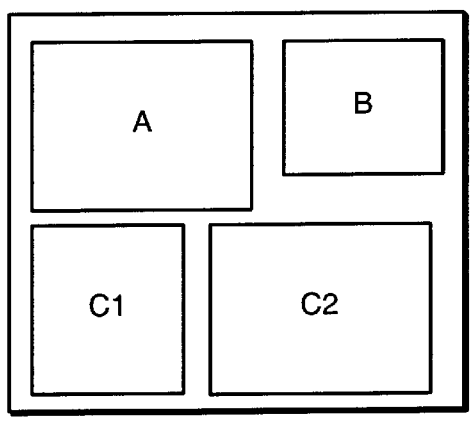
FIG._19
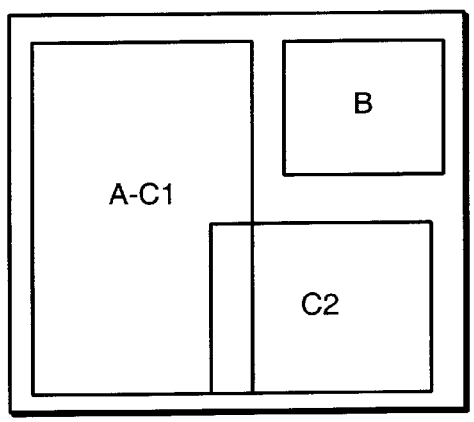
FIG._20
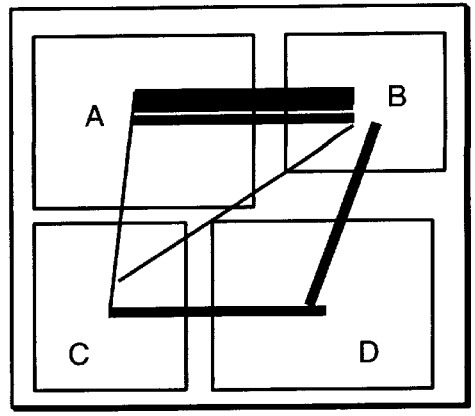
FIG._21

US 6,170,080 B1

METHOD AND SYSTEM FOR FLOORPLANNING A CIRCUIT DESIGN AT A HIGH LEVEL OF ABSTRACTION

BACKGROUND OF THE INVENTION

1. Field of the Invention

The present invention relates generally to a method and system for implementing a circuit design. More particularly, the invention relates to a method and system for implementing a circuit design by floorplanning the design at a high level of abstraction.

2. State of the Art

An application specific integrated circuit (ASIC) is typically produced by developing a behavioral description of the desired circuit functions, determining a list of instances or blocks of logic needed to implement the desired functions, arranging the blocks of logic into a floorplan that meets desired constraints, and physically laying out the floorplan on the integrated circuit.

Currently, most floorplanning tools work at a relatively low, level of abstraction using structural netlists. A conventional process used to implement a circuit design is illustrated in FIG. 1a. As shown in FIG. 1a, the designer inputs a Register Transfer Level circuit design into a synthesis tool at step 100 and, using estimated wire load models, produces a netlist file (e.g., {nls}file). At step 110, the designer floorplans the netlist using a floorplanning tool. This produces a physical data electronic format file (e.g., {pdf}file) which includes a list of clusters (i.e., groups of instances representing functional blocks of logic), a wire load model file (e.g., {wlm}file) which includes the names of the wire load models of the physical clusters, and a floorplanning file (e.g., {flr}file) which holds the floorplan. The designer then re-synthesizes the circuit design at step 120 using the wire load models, the clustering information, the netlist file produced at step 100, and timing and design rule constraint files (e.g., {tco}file and {dco}file). This re-synthesis produces a new netlist file (e.g., {nls}file') listing of which instance belongs to which cluster. Finally, the designer re-floorplans the new netlist at step 130, using the new netlist file and the floorplanning file created at step 110.

There are many drawbacks to the conventional process shown in FIG. 1a. One drawback is that the designer synthesizes the circuit design twice. Another drawback is that the designer exchanges large data files between several Electronic Data Automation (EDA) tools many times. The FIG. 1a process also involves describing the circuit design using a hardware description language (HDL) before starting the floorplan of the circuit design. As such, this conventional process wastes time and resources.

There is thus a need for a system and method of circuit design and implementation by which a designer can floorplan a circuit design at a high level of abstraction. This need is because the circuit designer may want to begin to floorplan the design at a high level of abstraction before finishing the netlist. For example, the designer may want to estimate the physical size of circuit design or to place certain critical entities close together to speed the signal propagation time of these entities. Alternately, the designer may want to floorplan at a high level of abstraction so that inter-block wiring capacitances and intra-block wire load models can be estimated before the circuit design is completed. This information is important for good synthesis and optimization of the circuit design. As such, a netlist of the circuit design must be produced before a system designer working at a high level of abstraction, such as the Register Transfer Level (RTL), can floorplan the circuit design.

SUMMARY OF THE INVENTION

The present invention is thus directed to providing a floorplanning tool which can operate at a high level of abstraction. Exemplary embodiments are directed to a floorplanning tool which can read and represent an original logical hierarchy at a high level of abstraction, and which can perform block placement at a high level of abstraction. Further, exemplary embodiments permit the designer to manipulate logical entities in a circuit design without affecting other logical entities.

According to exemplary embodiments of the present invention, a floorplanning tool is provided by which a designer can break down a logical hierarchy to build a physical hierarchy or floorplan, thereby providing the designer information to help build the physical hierarchy. A floorplanning tool according to exemplary embodiments can also derive wire load models for the physical hierarchy, extract inter-block capacitance values and communicate them to a synthesis tool in order to drive the optimization process. Exemplary embodiments can communicate these wire load models, together with the physical hierarchy, to the synthesis tool to correctly drive it, and write a floorplanning file which includes the size and the location of the different areas.

Generally speaking, exemplary embodiments of the invention relate to a method and a system for implementing a circuit design in an integrated circuit by arranging a floorplan of the circuit design at a high level of abstraction. The circuit design is then synthesized based on the floorplan, and the synthesized design is laid out physically on an integrated circuit.

BRIEF DESCRIPTION OF THE DRAWINGS

These and other advantages and objects of the invention will become more apparent from the following detailed description of preferred embodiments when read in conjunction with the attached Figures in which:

FIG. 1a illustrates a conventional design process for implementing a circuit design;

FIG. 1b illustrates a design process according to one embodiment of the present invention;

FIG. 1c illustrates an exemplary embodiment of a system for implementing the design process of FIG. 1b;

FIGS. 2a and 2b depict a box representation and a tree representation, respectively, of a hierarchical view of a top entity with a shallow entity;

FIGS. 3a and 3b illustrate interactive windows of an exemplary floorplanner according to one embodiment of the present invention;

FIG. 4 illustrates an exemplary hierarchical view according to one embodiment of the present invention;

FIGS. 5a–5c illustrate icons reflecting types of cells according to one embodiment of the present invention;

FIGS. 6, 7a, and 7b illustrate a Logical Hierarchy Displayer according to one embodiment of the present invention;

FIGS. 8a and 8b depict exemplary hierarchical views according to one embodiment of the present invention;

FIG. 9 illustrates an area parameters pop-up window according to one embodiment of the present invention;

FIGS. 10a–10d illustrate cell attribute icons;

FIGS. 11a and 11b illustrate logically merging and unmerging an area according to one embodiment of the present invention;

FIG. 12 depicts physical areas in the Logical Hierarchy Displayer window according to one embodiment of the present invention;

FIG. 13 illustrates a switch window according to one embodiment of the present invention;

FIG. 14 illustrates a process for switching a cell according to one embodiment of the present invention;

FIGS. 15 and 16 illustrate netlist generation for concurrent engineering according to one embodiment of the present invention;

FIG. 17 illustrates a pop-up table for cell information according to one embodiment of the present invention;

FIGS. 18 and 19 illustrate creating a floorplan according to one embodiment of the present invention;

FIG. 20 illustrates overlapping areas due to merging/unmerging according to one embodiment of the present invention; and FIG. 21 depicts a typical net bundle view according to one embodiment of the present invention.

DETAILED DESCRIPTION OF THE PREFERRED EMBODIMENTS

An exemplary design process for implementing a circuit design according to the present invention is illustrated in FIG. 1b. The exemplary FIG. 1b process will be described in the context of the Register Transfer Level. In this regard, reference is made to the ChipPlannerCB User Guide, Compass Design Automation, Inc., August 1996; the ASIC Synthesizer User Guide, Compass Design Automation, Inc., September 1996; and the COMPASS Timing Analysis User Guide, Compass Design Automation, Inc., December 1996; the contents of which are hereby incorporated by reference in their entireties.

In step 140 of FIG. 1b, the designer arranges a floorplan of the circuit design at a high level of abstraction, such as the Register Transfer Level, using estimated wire load models (e.g., {vhd}file and {v}file), timing constraints (e.g., {tco}file), design rule constraints (e.g., {dco}file), and a floorplanning tool implemented according to exemplary embodiments of the present invention. This produces a parasitic file (e.g., {pst}file), which includes the value of the estimated inter-block capacitances, a {pdf}file which includes a list of the physical clusters, a wire load model file (e.g., {wlm}file), which includes the name of the wire load models of these clusters, and a floorplanning file (e.g, {flr}file), which holds the Register Transfer Level floorplan.

Next, the designer synthesizes the Register Transfer Level floorplan at step 150, using the {vhd}file, {v}file, {tco}file, and {dco}file and the results of the floorplanning step 150. This produces a netlist file (e.g., {nls}file). This synthesis step 150 is similar to the synthesis of FIG. 1a. However, unlike the conventional design process of FIG. 1a, all of the necessary constraints and rules are available, thereby requiring only one synthesis. The designer then arranges the physical floorplan according to the netlist and the Register Transfer Level floorplan at step 160.

Comparing FIG. 1b with FIG. 1a, it is apparent that the exemplary process of FIG. 1b is much simpler and less time-consuming than the conventional floorplanning process of FIG. 1a.

FIG. 1c illustrates an exemplary system for implementing the design process of FIG. 1b according to one embodiment of the present invention. The system includes a display means, such as a computer monitor 200, for communicating information in the form of screen displays to the designer. The designer can enter inputs via input means, such as a keyboard 210 or a mouse 220. The designer's inputs are manipulated via preconfigured software under the control of a control unit such as a computer 230.

Before describing particular features of an exemplary floorplanning tool according to the present invention, various terms will be discussed as a general overview. For the purposes of this discussion, an area is the basic block the Register Transfer Level floorplanner manipulates. An "Area" can comprise a group of standard cells or gates. For example, a macro cell such as a random access memory (i.e., RAM) compiled datapath is an "area".

At the beginning of an exemplary Register Transfer Level floorplanning session, the areas match the logical hierarchical cells. That is, an area initially corresponds to a logical cell. In the Register Transfer Level floorplanning process, the designer can create physical areas composed of more than one logical cell. The Register Transfer Level floorplanner therefore helps the designer intelligently build physical areas of a circuit design from the logical cells at a high level of abstraction.

A "leaf component" is an entity at the lowest physical level; that is, an entity which does not include any other entities (e.g., the lowest logical component available to the designer). A hierarchical entity is an entity with architecture including at least one leaf component. That is, a hierarchical entity includes at least one other entity.

VHDL entities are composed of structural instructions and behavioral instructions. Structural instructions refer to other entities or directly to a leaf component, while behavioral instructions are synthesized and mapped to leaf components.

In an exemplary embodiment, when at least one leaf component and at least one hierarchical entity are present at the same time on the same level, a shallow entity is created. The shallow entity is composed of all leaf components located on the same level as the hierarchial entity. In an exemplary embodiment, it is desirable at each hierarchial level to have only hierarchial entities or only leaf components. The use of a shallow entity groups all of the leaf components into a new hierarchial entity. So that the user will see only hierarchial entities, and not leaf components.

A shallow entity of a hierarchical entity is produced by synthesizing the behavioral instructions and the leaf component structural instantiation of the architecture of the hierarchical entity. In an exemplary embodiment, a shallow entity of a hierarchical entity is named by appending the name of the hierarchical entity with the "_shallow" suffix.

FIGS. 2a and 2b depict a box representation and a tree representation, respectively, of a hierarchical view of a top entity with a non-leaf component subcell, "sub", and a shallow entity, "top_shallow".

One goal of a Register Transfer Level floorplanner according to an exemplary embodiment of the present invention is to be able to represent both the original logical hierarchy and the physical hierarchy in order to help the designer easily move through the representations, and from one representation to the other. From a flow point of view, the designer incrementally builds the physical hierarchy from the logical one. Accordingly, the first view displayed can be the logical hierarchy view of the design. However, while building the physical hierarchy, a good display of both the physical hierarchy and the logical hierarchy is useful, with both hierarchies being displayed at the same time.

Because the physical hierarchy will not necessarily match the original logical hierarchy, it is difficult to try to represent both hierarchies in the same display window. Exemplary embodiments therefore use two display windows. A logical hierarchy textual display window is used to represent the original logical hierarchy and to navigate in the logical hierarchy, and a graphic window is used to represent the physical hierarchy and to Register Transfer Level floorplan the design. At the beginning of the design process, the physical hierarchy matches the logical one.

Two exemplary display windows are shown in FIGS. 3a and 3b as a Logical Hierarchy Navigator window 300 and a physical window 350, respectively. The Logical Hierarchy Navigator window 300 can be used by the designer to manipulate the logical hierarchy and specify cell attributes before Register Transfer Level floorplanning. The physical window 350 can be used by the designer to manipulate the physical hierarchy of the circuit design.

The Logical Hierarchy Navigator window 300 is automatically created and filled with the logical design hierarchy when a design is loaded. In FIG. 3a, a logical hierarchy with one instance A(U1) of a cell A, and two instances B(U2) and B(U3) of a cell B is shown. In FIG. 3b, an equivalent physical representation of the logical hierarchy is shown. Thus, the number of instances of cells seen in both physical and logical views is the same. The following description explains how the logical hierarchy of a design is displayed.

FIG. 4 illustrates an exemplary hierarchical view according to one embodiment of the present invention. Referring to FIG. 4, A_SHALLOW is the shallow entity of the cell A. A1 and A2 are subcells of the cell A. C1 and C2 are subcells of the cell C. C21 and C22 are subcells of the subcell C2.

FIGS. 5a–5c illustrate icons reflecting the type of cell. FIG. 5a shows an icon for a "top" cell, FIG. 5b shows an icon for an "intermediate" cell, and FIG. 5c shows an icon for a "leaf" cell. These icons are referred to herein as "primary" icons. These icons can be stored, for example, in a bitmaps directory.

FIG. 6 illustrates a Logical Hierarchy Displayer window 600 according to one embodiment of the present invention. The Logical Hierarchy Displayer window 600 provides a more advanced representation of the logical hierarchy than the Logical Hierarchy Navigator 300. Each cell name in the window 600 can be preceded by an icon indicating the type of the cell. For example, the icon before the cell A indicates that the cell A is an intermediate cell, and the icon before the cell B indicates that the cell B is a leaf cell.

Cells can be selected in the Logical Hierarchy Displayer window 600 by either manipulating a default selection mechanism (for example, by clicking on a left mouse button with/without the "shift" or "ctrl" key), or by using application specific commands. For example, a leaf cell can be selected in the Logical Hierarchy Displayer window 600 by single-clicking on the name of the leaf cell. A hierarchical cell can be selected by single-clicking on its name, while pressing the "ctrl" key. Alternately, any other specified selection technique can be employed.

Once a cell is selected, it is highlighted. When another cell is selected, that cell is highlighted, and the previously selected cell is deselected. Additional cells can be selected without deselecting previously selected cells by, for example, single-clicking on the additional cells while pressing the "ctrl" key. Also, cells between two cells can be selected by pressing the "shift" key while single-clicking on these two cells.

Before Register Transfer Level floorplanning the design, the designer might want to specify the basic areas to be floorplanned. Accordingly, exemplary embodiments specify the basic areas to be floorplanned and indicate in the Logical Hierarchy Displayer 600 these basic areas. Representing the logical hierarchy of a description in the Logical Hierarchy Displayer 600 helps the designer navigate in a large design in order to determine the basic areas to Register Transfer Level floorplan. When floorplanning, there is a one-to-one mapping between the framed cells in the Logical Hierarchy Displayer 600 and the visible areas in the physical window 350, except when the logical hierarchy has been broken by merging some areas. In such a case, the number of areas in the Logical Hierarchy Displayer 600 is greater than the number of areas in the physical window 350. The areas in the physical window 350 can be represented as boxes filled by the same color as the corresponding box in the Logical Hierarchy Displayer 600.

FIG. 7a illustrates a menu which can be automatically activated by, for example, clicking on the right mouse button in the Logical Hierarchy Displayer window 600. The top menus appearing in the Logical Hierarchy Displayer window 600 include the "File" menu, the "Setup" menu, the "Commands" menu, composed among other things of right mouse button menus, an "Estimates" menu, and a floorplan "FLP" menu.

FIG. 7b shows a current cell menu 700 which is displayed in response to, for example, clicking again on the right mouse button. This menu allows specific cells to be manipulated as described in detail below.

As shown in FIG. 7a, there are five commands which may be used to select additional cells. The "Select Cell" command prompts the designer with a dialog box requesting the cell name of the cell(s) to be selected. The "Select Inst" command prompts the designer with a dialog box requesting the instance name(s) of the cell(s) to be selected. Rather than entering a particular name, the designer can enter a "wild card" request for a cell of any name. The "Select Area" command includes three commands which are not shown in FIG. 7a, but which are accessed by clicking on the right arrow next to "Select Area". These commands include "Select Area→From Name", "Select Area→From List", and "Select Area→From Cells". The "Select Area→From Name" command prompts the designer with a dialog box requesting the name of the area to be selected. The "Select Area→From List" command prompts the designer with a list of all existing area names. The designer selects one of these areas. The "Select Area→From Cells" command goes through all the currently selected cells, identifies all the areas "touched" by these selected cells, and then selects all the cells belonging to all these areas. This command is used, for example, when only one cell is selected.

Whatever the selection command used, if the cell to be selected is not currently visible because the design is not sufficiently expanded, then the design can be automatically expanded up to that cell. The Logical Hierarchy Displayer 600 automatically scrolls to make either the selected cell visible, if there is only one cell to be selected, or one of the selected cells visible if more than one cell is to be selected.

A cell can be located in the Logical Hierarchy Displayer 600 by scrolling. Since this might be tedious in a large design, the designer can also use the "Find Cell" command to locate a cell. This command prompts the designer with a pop-up window requesting the name of the cell to be found. The designer can enter a "wild card" request to find any cell rather than a particular cell. When the designer specifies a name of a cell to be found, the Logical Hierarchy Displayer 600 focuses on and "frames" that cell.

The designer can also locate a cell by using the "Find Inst" command. This command prompts the designer with a dialog box requesting the instance name of the cell desired to be found. The designer can enter a "wild card" request for any instance rather than a particular cell instance.

HDL descriptions often include a large amount of hierarchy, all of which the designer might not be interested in viewing. Also, the designer might want to view different logical cells at different hierarchical levels. To permit the designer to view different cells at different hierarchical levels, the Register Transfer Level floorplanner according to one embodiment of the present invention includes "expand" and "collapse" mechanisms. By default, these features are built into the Logical Hierarchy Displayer 600. Double-clicking on the left mouse button can be used to expand an unexpended highlighted cell by one level, or to collapse an expanded highlighted cell by one level. Rather than expanding each cell individually, the designer can select the command "Expand All" from the current cell menu (FIG. 7b) to totally expand a selected cell.

FIGS. 8a and 8b depict exemplary hierarchical unexpended and expanded views according to one embodiment of the present invention. For example, FIG. 8a shows how the Logical Hierarchy Displayer window 600 looks when initialized with a design. When the designer expands the hierarchy of cell A, the logical hierarchy displayed is that shown in FIG. 8b.

With the expand/collapse mechanism, the designer can focus on a part of the design of particular interest. By default, when the design is loaded, only the first level of hierarchy is displayed.

One of the main goals of the Register Transfer Level floorplanner according to the present invention is to allow concurrent engineering. For example, the designer might only be interested in designing cell A because cells B and C are being handled by other designers. In this case, the designer can obtain size expectations for cells B and C from designers B and C, and then estimate the size of cell A. Thus, this exemplary embodiment can be used to specify those cells for which the designer wants to estimate the attributes and those cells for which the designer wants to specify the size. This can done by clicking on the right mouse button to display the current cell menu 700 (FIG. 7b) and then selecting the "Set Area Parameters" command. This causes the area parameters pop-up window 900 illustrated in FIG. 9 to be displayed. Using the pop-up window 900, the designer can edit area attributes, enter cell estimates, specify gate equivalents, and specify cell size.

To edit area attributes, the designer enters information into the Area Attribute block 910. The designer can edit the area name using the "Area Name" entry, the default area name being the logical cell entity. The designer can also edit the area color by selecting one of the colors proposed by the "Area Color" entry. The colors can, for example, include a default (none), blue, brown, green, grey, lightblue, olive, orange, red, violet and yellow.

The designer can edit the area mode by selecting one of the three modes proposed by the "Area Mode" entry. These three modes include "Estimated", "Specified gateEquiv", and "Specified Size". The default mode is "Estimated," i.e., by default, the Register Transfer Level floorplanner assumes that all area sizes are to be estimated.

The designer can access the list of cells composing an area by examining the "Area Merged Cells" list.

Using the "Estimated" block 920, the designer can enter estimates of parameters for an area whose size is to be estimated. These parameters include "Minimum Ratio" which lets the designer specify the minimum area aspect ratio, "Maximum Ratio" which lets the designer specify the maximum area aspect ratio, and "Factor" which lets the designer add some optimism/pessimism factor to the value of the estimation. The last entry of the "Estimated" block 920 indicates the area estimation value, only available when estimation has been performed for a cell.

Using the "Specified Gate Equiv" block 930, the designer can specify the gate equivalent area. The designer sets parameters including "Value" to specify the gate equivalent value of the area, "Minimum Ratio" to specify the minimum aspect ratio of the area, and "Maximum Ratio" to specify the maximum aspect ratio of the area.

Finally, the designer can use the "Specified Size" block 940 to specify the size of an area. The designer sets parameters "X" to specify the width of the area and "Y" to specify the height of the area.

The area parameters of an area are echoed in the Logical Hierarchy Displayer 600 by the look of secondary icons. For example, there are four different types of secondary icons, and these icons reflect the cell attributes according to area parameters which have been set.

FIGS. 10a–10b illustrate secondary icons reflecting cell attributes according to one embodiment of the present invention. FIG. 10a illustrates an icon indicating that the gate equivalent area has been estimated for a cell, FIG. 10b illustrates an icon indicating that the gate equivalent area is to be estimated for a cell, FIG. 10c illustrates an icon indicating that a gate equivalent area has been set for a cell, and FIG. 10d illustrates an icon indicating that a size has been specified for a cell. These icons can be stored in the bitmaps directory.

To avoid having to click on a cell when the only information the designer wants to retrieve is the attribute of the cell, exemplary embodiments allow the designer to quickly access cell attribute information. This can be done, for example, by filling the frame of the cell having the "estimate" attribute.

If the designer wants to break the initial logical area of a cell C, this can be done from the Logical Hierarchy Displayer 600 by first selecting a cell having a logical area and then by selecting the command "Unmerge Logical Cell" in the current cell menu 700 (FIG. 7b). For example, for the display illustrated in FIG. 11a, FIG. 11b illustrates an unmerging of the area of cell "Top".

The logical area of a cell can be re-built in the Logical Hierarchy Displayer window 600 by selecting a hierarchical logical cell without any secondary icon and by selecting the "Merge Logical Area" from the current cell menu 700. For example, assuming that the current display is the one shown in FIG. 11b, FIG. 11a illustrates how the design looks after merging all the logical areas of the cell "top". When merging areas, the resulting area is always, by default, an "estimated" area whose gate equivalents (gateEquiv) value equals the sum of all "estimated" gateEquiv of the cells composing this new area.

The merge command also allows areas to be merged which do not belong to the same top cell hierarchy. More particularly, the physical hierarchy can be built and broken in the Logical Hierarchy Displayer window 600 using the three following commands from the current cell menu 700 (FIG. 7b): "Merge Physical Area", "Unmerge Physical Area", and "Detach Physical Area". To merge physical areas, the designer selects at least two cells having an area, and then invokes the "Merge Physical Area" command.

To unmerge a physical area, the designer selects one cell having a physical area (that is one cell having a secondary icon and merged cells), and invokes the "Unmerge Physical Area" command in the current cell menu 700. This creates subareas corresponding to the hierarchical cells belonging to the original physical area and removes the original physical area.

To detach a physical area, the designer selects one cell having an area and invokes the "Detach Physical Area" command from the current cell menu 700. This creates a new area for the detached cells while maintaining the original physical area.

Building the physical hierarchy is also possible in the physical window 350 once the design is Register Transfer Level floorplanned. More particularly, in the Logical Hierarchy Displayer window 600, an area which does not respect the logical hierarchy, e.g., a physical area, cannot be shown in a graphical manner. However, information about the physical area can be retrieved from the Area Parameters pop-up window 900 of a logical area. To retrieve information about the physical area, the "setARea parameters" command is selected from the current cell menu 700, and a logical area which forms the physical area is "clicked" on. Then, the pop-up area attribute window 900 corresponds to the physical area, and the list of logical areas which have been merged into the physical area can be seen by clicking on the Area Merged Cells option.

FIG. 12 depicts physical areas in the Logical Hierarchy Displayer 600 according to one embodiment of the present invention. In FIG. 12, cells A and C1 have been merged together. By clicking on the logical cell A or C1, the same area attribute pop-up window is displayed where there is information about the physical area A-C1. Moreover, by clicking on "Area Merged Cells" the list of merged cells A and C1 is produced. The color of the frame surrounding the cells belonging to the same physical area can, for example, be the same as the corresponding area in the physical window 350. In this way, with a quick look in the Logical Hierarchy Displayer window 600, the designer can determine which logical cells belong to the same physical cluster.

As noted above, concurrent engineering is an advantageous feature of a Register Transfer Level floorplanner according to one embodiment of the present invention. A typical concurrent engineering problem is as follows: design A is already synthesized and optimized and exists as a cell {nls}a. Designer B wants to take advantage of this information to Register Transfer Level floorplan cell B in the top design. This situation is easily handled according to an exemplary embodiment of the present invention with a "Switch Cell" command.

By selecting the "Switch Cell" command from the current cell menu 700 and clicking on the left mouse button in the Logical Hierarchy Displayer window 600, the designer is prompted with a switch window 1300 such as the one shown in FIG. 13. The designer provides the name of the logical cell in the box 1310 and accepts or cancels the name by invoking the "accept" and "cancel" commands.

Another concurrent engineering situation arises when designer A has already synthesized and optimized part of the design and wants to re-use that information as opposed to estimating the size of the design. The designer then switches the Register Transfer Level cell by the logical netlist (a.nls), and selects the "estimated" attribute for that Register Transfer Level cell. Then, when the estimation is run, the gates in the logical netlist, a.nls, are simply added. The "Switch Cell" command is disabled as soon as the design is Register Transfer Level floorplanned.

The switch command can change the logical hierarchy of the design. For example, if the designer switches hierarchical cell A by flat netlist a_p.nls, cell A is replaced by cell "a_p" in the Logical Hierarchy Displayer window 600, and a hierarchy is no longer visible in the Logical Hierarchy Displayer 600.

FIG. 14 shows an exemplary process for switching a cell C according to one embodiment of the present invention. When a cell is switched, the cell attributes of its subcells are lost. As shown in FIG. 14, cell attributes of both subcells C1 and C2 are lost, and the new cell C' has the default cell attribute.

The switching capability presented above is a simple mechanism which enables a Register Transfer Level floorplan to be created by taking into account some already known parts of the design.

An automatic concurrent flow can also be implemented to allow concurrent engineering and design reuse, in both the Register Transfer Level and the physical floorplanner. This flow includes producing the netlist with the known information regarding the Top-Level connectivity, and the logical hierarchy. Basically, the design is divided into logic hierarchical cells and logic areas, with no shallow entity and no physical area. Each team is associated with a logic area, and the "Team Design" is produced. This design includes the top-level hierarchical cells, and a parameter cell {pcl} in place of the logic areas. A parameter cell is a cell of a compiler, e.g., a {pcl}ram is a cell of a RAM Compiler. These cells can be replaced by a black-box cell in the timing verifier tool, when invoked from Chiptime, the Compass Static Timing Verifier available from COMPASS Design Automation, Inc., or Asic Synthesizer (AS) also available from COMPASS Design Automation, Inc., a macro cell phantom in the back-end tools, a timing model in the timing, verifier tool when invoked from any tool, or a netlist in any tool.

An additional entry "Output Team Design" can be added in the "File" menu of the Logical Hierarchy Displayer window 600. Selecting this entry causes a table to appear, to enter the "Team Design" suffix. This design is composed of the original logical hierarchical cells down to the hierarchical cells which are part of an area or which include a shallow entity. When such a logical hierarchical cell is found, the generic netlist hierarchy is pruned and a {pcl} cell is created in its place, with the template name "rtlfp_conc".

FIG. 15 illustrates netlist generation for concurrent engineering according to one embodiment of the present invention. Referring to FIG. 15, the floorplan at the Register Transfer Level has been arranged so that the areas lay at the level A_SHALLOW, A1, A2, B, C1, C2 and so that the {pcl}'s are created at the level A, B, C1, C2. The {pcl} of the cell A has been done because there is a shallow entity in A.

The default behavior of the {pcl} can be changed by going into the cell compiler, and changing the {pcl} parameters. The parameters include Place_Option whose value is one of (phantom,netlist), Timing_Option whose value is one of (VLSIModel,netlist), Phantom_Name, VLSIModel_Name, and Netlist_name.

The default{pcl} created for each logical cell "cell" has the values Floorplan Option=netlist, Timing_Option=netlist, Phantom_Name=cell_name_with_suffix, VLSIModel_Name=cell_name_with_suffix, and Netlist_Name=cell_name_with_suffix.

The {pcl} is not associated with any compiler but provides the powerful switching ability.

To floorplan a design at a high level of abstraction such as Register Transfer Level, the floorplanner according to one embodiment of the present invention is provided with the area gateEquiv or size of all the design areas. As described above, this area size/gateEquiv can be set by the designer by setting the areas in "specified size" or "specified gateEquiv" mode and by setting the area gateEquiv or by setting the area width and height. The designer can also set the "estimated" mode on some areas. Then the designer runs the estimator on these areas in order to get the gateEquiv value of these areas before floorplanning.

Register Transfer Level estimation is a process including estimating the gateEquiv value of the different logical cells composing a design. There are three Register Transfer Level estimators available under the "Estimates" top scroll down menu. These estimators include "Preview RTL", which is global and fast, "Prepare RTL Estimation", which is also global but slower than "Preview RTL" and "Estimate RTL", which is local and accurate.

Previewing a Register Transfer Level ("Preview RTL") cell is a very fast process using a language based pure inference method which is performed following parsing. Previewing includes a quick synthesis of all the design logical cells, whatever the mode of the area to which these cells belong. In one embodiment of the present invention, the "Preview RTL" performs no optimization. As those skilled in the art will appreciate, other embodiments of the present invention can include performance of any known optimization techniques; however, such techniques can affect the speed of the "Preview RTL" command. At the end of the previewing, all the areas have their "estimated gate equiv" field filled. Also, all the areas which had the "estimation to be performed" icon (FIG. 10b) now have the "estimation performed" icon (FIG. 10a). That is, there are no more "estimation to be performed" icons in the Logical Hierarchy Displayer 600, allowing the designer to Register Transfer Level floorplan the design.

Preparing a Register Transfer Level Estimation ("Prepare RTL") is a fast process which includes a synthesis of all the design logical cells, regardless of the mode of the area to which these cells belong. In one embodiment of the present invention, the "Prepare RTL" synthesis is fast because it does not perform boolean equations optimization, e.g., minimization. As those skilled in the art will appreciate, other embodiments of the present invention can include performance of any known optimization techniques; however, such techniques can affect the speed of the "Prepare RTL" command. A design representation is stored in a memory which allows the later addition of constraints, such as, timing constraints and logic design rules constraints.

At the end of the preparing, all the areas have their "estimated gate equiv" field filled. Also, all the areas which had the "estimation to be performed" icon now have the "estimation performed" icon. That is, there are no more "estimation to be performed" icons in the Logical Hierarchy Displayer 600, allowing the designer to Register Transfer Level floorplan the design. The main differences between "Preview RTL" command and "Prepare RTL Estimates" commands are the "Prepare RTL" command is a little bit slower and more accurate than "Preview RTL" and the "Prepare RTL" command is mandatory before using "Estimate RTL" command, while "Preview RTL" is not sufficient before running "Estimate RTL".

Note that "Prepare RTL" can be run after "Preview RTL", and the designer need not run "Preview RTL" before running "Prepare RTL".

In accordance with the exemplary embodiment, where an accuracy difference between "Prepare RTL" and "Preview RTL" commands is not that great, the designer can select only the "Prepare RTL" to be run.

Estimating a Register Transfer Level ("Estimate RTL") cell involves quick synthesis of the selected cells of the design. The "Estimate RTL" command takes into account constraints, e.g., the constraints entered following the "Prepare RTL" command, and performs timing propagation through the design representation in order to calculate and improve the circuit timing performance. The "Prepare RTL" command can therefore run before running the "Estimate RTL" command.

Cell size is not only a function of the cell behavior available in the original HDL description but is also a function of the design timing and design run constraints. This is why just after having run the "Prepare RTL Estimate" and before running the "Estimate RTL" command, the timing constraint files, {tco}file can be loaded as well as the design rule constraint file, {dco}file, using the Physical Window 350 "open" command.

Logical cell information can be retrieved by selecting the "Cell Information" command from the current cell menu 700 (FIG. 7b). This causes a pop-up table 1700 such as that shown in FIG. 17 to be displayed relating to the selected logical cell. The pop-up table 1700 informs the designer of the name of the logical cell selected, the name of the instance the cell is an instance of, and the estimated gateEquiv of that cell, if this information is available. Otherwise, the pop-up table 1700 will display the "N/A" string.

When the designer is satisfied with the logical hierarchy built in the Logical Hierarchy Displayer window 600, the designer can create the floorplan of the HDL description by using the command "FPR→Create Floor Plan→RTL FP" command in the physical window 350 which is identical to the create FLP command as shown in FIG. 7a. The designer can also create the floorplan from the Logical Hierarchy Displayer window 600 by using the "FPR→create floor-plan rtlfp" command. These two commands produce substantially the same result.

FIG. 19 shows a floorplan that can be displayed by floorplanning the design hierarchy of FIG. 18.

Note that Register Transfer Level floorplanning cannot be done if there are some cells with the attribute "estimated" which have not been estimated yet ("to-be-estimated"). Once the Register Transfer Level floorplan is complete, the Logical Hierarchy Displayer 600 and the physical window 350 are fully synchronized. That is, any action taken in the Logical Hierarchy Displayer window 600 is reflected in the physical window 350, and vice versa. For example, if an area is edited in the Logical Hierarchy Displayer 600 and its size, gateEquiv, or color (according to its mode) is modified, the look of the corresponding area in the physical window 350 can be modified as well.

Once the Register Transfer Level floorplan has been created, it can be discarded using the "FLP→discard floorplan" command which is available in the FLR scroll down menu (not shown) of the physical window 350.

When editing a floorplan, it is possible to perform the same modification to the Logical Hierarchy Displayer window 600 and the physical window 350 by using the "change" command, available in the physical window 350 right mouse button pop-up menu (not shown) and clicking on an area. The designer is then prompted with a pop-up window providing some information about the area and proposing some information that can be changed.

If the designer clicks on a gateEquiv area (estimated or specified), the following can be modified in the pop-up window: the name of the wire load model corresponding to that area and which will be used when deriving the wire load model, the routing factor of that area, and the gate equivalent of that area. If modified, it is sent to the Logical Hierarchy Displayer 600. The color of the area can be also modified, and the new color is sent to the Logical Hierarchy Displayer 600.

In the case of a size area, the "change" pop-up window lets the designer modify the size of the area sent to the Logical Hierarchy Displayer 600, the color of the area sent to the Logical Hierarchy Displayer 600, the name of the wire load model corresponding to that area and which will be used when deriving the wire load model, and the routing factor of that area.

Using the physical window 350 "reshape" command, the designer can manually modify the shape of a gateEquiv area, setting the area constant. A size area cannot be reshaped.

Using the physical window 350 "adjust" command, the designer can modify the size X, Y of size area. The new size area is sent to the Logical Hierarchy Displayer 600.

It is preferable that the gateEquiv area should not be adjusted.

The designer can also modify the physical hierarchy by using the two physical window 350 commands including "Floor→Merge some" and "Floor→unmerge". To use the "merge some" command, the "merge some" command is selected, the list of areas desired to be merged are framed with the mouse left button (exactly as you use the physical window 350 "flatten some" command), and that selection is accepted with the middle mouse button. To unmerge an area, the "unmerge" command is selected, and the area desired to be unmerged is clicked on with the left mouse button.

After merging/unmerging areas, it is very likely that some areas overlap each other as shown, for example, in FIG. 20. The overlapped areas can be "unoverlapped" by using the "move" command, available in the right mouse button pop-up menu of the physical window 350, or the automatic "unoverlap" command, available in the floorplan scroll down menu (not shown) in the physical window 350.

As soon as the Register Transfer Level floorplan is complete, the interblock net bundle can be visualized by using the "physical window→setup→view" command. The designer is then prompted with a pop-up window which lets the designer control what is displayed in the physical window 350, for instance the area name, the net bundle, and so on.

FIG. 21 depicts a typical net bundle view according to one embodiment of the present invention. The net bundle view is important to help the designer improve the Register Transfer Level floorplan. For instance, in FIG. 21, the large number of interconnects between area "A" and "B" can help the designer decide to merge these two areas, or at least to install them close together. This view can be obtained at the Register Transfer Level of abstraction.

Interblock routing can be estimated in the Register Transfer Level floorplanner by using the new "Estimate→estimate RTL routing" command in the physical window 350. That estimation starts with a random area pin assignment. Following the assignment, a global routing is performed. Next, the area pin alignment is refined.

Once the Register Transfer Level routing is done, routability congestion maps can be displayed. The display of these congestion maps can be controlled by using the "setup→view" display control pop-up window.

The designer can eliminate the Register Transfer Level routing estimation by using the "Estimates→Unestimate RTL routing" command.

Once the basic Register Transfer Level floorplan is laid out, the designer can improve it by, for example, moving, reshaping, merging, and unmerging areas. Moreover, the Register Transfer Level estimation can be re-run or the cell attributes can be edited to change the gateEquiv, the minimum and maximum ratio, the physical size, and so on. Then, each time something is changed in a cell attribute (new setting or new estimation), the new attribute is sent to the physical window 350 which updates the floorplan, accordingly.

The generation of the interblock capacitance does not require any new command. It is automatically done when the "output→pst file" or the "output→synopsys parasitic command" is used. If the Register Transfer Level routing has been estimated, then interblock capacitance values are computed according to that routing estimation. Otherwise, the interblock capacitance values are computed area center to area center.

In the Logical Hierarchy Displayer 600, whatever the level of hierarchy they are instantiated in, all pads are regrouped in one "dummy" hierarchial cell. When that cell is clicked on, then all the pads become visible.

The foreign wire load model can be imported by using the "open" command and specifying the name of the wireloadmodel:{wlm}toto.

The generation of the wire load models does not require any new graphical designer interface commands. It can be done by re-using the "output wireloadmodel" command. The generation of these custom wire load models is done according to the area gateEquiv, aspect ratio, and routing factor, by interpolating the wire load model data base.

The aspect ratio routing factor can be specified/modified by using the "setup→WLM Derating Factor→derating factors" command. The designer is then prompted with a table proposing a list of routing factors and corresponding derating factors. The derating factors can be edited.

The Register Transfer Level floorplanner according to one embodiment of the present invention can be delivered by default with a 0.35 passport library. This ensures that the physical window 350 has all the technology files, mandatory to boot.

For designers using a library not yet imported that want to use the Register Transfer Level floorplanner, they will enter information related to their library. They will thus have the ability to specify some area and timing technology scaling factor telling how faster/slower or bigger/smaller their library is compared to the already imported libraries.

The way to specify these values is by using the "setup→Technology Scaling Factors" command. The designer is then prompted by a pop-up window requesting some area and technology scaling factor. Default values are "1.".

According to exemplary embodiment of the present invention, the Register Transfer Level floorplanner is a tool which can read and represent an original logical hierarchy at a high level of abstraction, can perform block placement at the Register Transfer Level of abstraction, can permit the designer to manipulate a particular logical hierarchical cell without affecting the other hierarchical cells, can be used to break the logical hierarchy little by little in order to build the physical hierarchy, that is the design floorplan, giving the designer information/cues to help build the physical hierarchy, can derive wire load models for the physical hierarchy, can extract inter-block capacitance values and communicate them to a synthesis tool in order to drive the optimization process, can communicate these wire load models together with the physical hierarchy to the synthesis tool in order to correctly drive it, and can write a floorplanning file which includes the size and the location of the different areas.

While the foregoing exemplary embodiments have been described in terms of a Register Transfer Level floorplanner, it should be understood that the invention is also applicable to floorplanning at other high levels of abstraction. It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for implementing a circuit design in an integrated circuit comprising the steps of:
    arranging a floorplan of the circuit design at a first level of abstraction;
    synthesizing the circuit design to a second level of abstraction, which is at a lower level of abstraction than said first level, based on the floorplan, said synthesizing being performed as a one-time synthesis without additional synthesis; and
    arranging the synthesized circuit design based on said one-time synthesis into a floorplan at a physical level.

2. The method of claim 1, wherein the first level of abstraction is a register transfer level.

3. The method according to claim 1, wherein the step of arranging a floorplan comprises:
    adjusting a layout of cells in the floorplan in response to inputs from a designer; and
    displaying the adjusted cell layout.

4. The method according to claim 3, wherein the step of adjusting comprises merging and unmerging cells.

5. The method according to claim 3, wherein the step of displaying comprises switching displays of hierarchical cell levels.

6. The method according to claim 3, wherein the step of displaying comprises simultaneously displaying physical and logical views of cells.

7. The method according to claim 3, wherein the step of adjusting comprises expanding and collapsing hierarchical cells.

8. A method according to claim 1 further comprising the step of:
    generating wire load models by interpolating a wire load model data base.

9. A method according to claim 1 further comprising the step of:
    generating interblock wire capacitances.

10. A method according to claim 1 wherein said step of synthesizing utilizes constraints necessary for the arranging step.

11. A method according to claim 10 wherein at least one of said constraints is estimated.

12. A method for implementing a circuit design in an integrated circuit comprising the steps of:
    deriving wire load models for a physical hierarchy of the circuit design;
    extracting inter-block capacitance values;
    communicating said inter-block capacitance values to a synthesis tool;
    communicating said wire load models together with the physical hierarchy to said synthesis tool;
    synthesizing, as a one-time synthesis without additional synthesis, the circuit design; and
    writing a floorplanning file.

13. A device for implementing a circuit design, comprising:
    display means for communicating information in the form of screen displays to a user;
    input means for communicating commands from said user; and
    control means for implementing circuit design software, wherein said control means further includes:
        means for deriving wire load models for a physical hierarchy;
        means for extracting inter-block capacitance values;
        means for communicating said inter-block capacitance values to a means for synthesizing;
        means for communicating said wire load models together with the physical hierarchy to said means for synthesizing;
        means for synthesizing, as a one-time synthesis without additional synthesis, the circuit design; and
        means for writing a floorplanning file.

14. A device for implementing a circuit design, comprising:
    display means for communicating information in the form of screen displays to a user;
    input means for communicating commands from said user; and
    control means for implementing circuit design software, wherein said control means includes:
        means for arranging a floorplan of said circuit design at a first level of abstraction;
        means for synthesizing said circuit design to a second level of abstraction, which is at a lower level than said first level, based on said floorplan, said synthesizing being performed as a one-time synthesis without additional synthesis; and
        means for arranging said synthesized design based on said one-time synthesis into a floorplan at a physical level.

15. The device according to claim 14 wherein said means for synthesizing utilizes constraints necessary for the means for arranging.

16. The device according to claim 15 wherein at least one of said constraints is estimated.

17. The device according to claim 14, wherein said control means automatically generates interblock wire capacitances.

18. The device of claim 14, wherein said first level of abstraction is a register transfer level.

19. The device of claim 14, wherein said means for arranging a floorplan comprises:
    means for adjusting a layout of cells in the floorplan in response to inputs from said input means; and
    means for displaying the adjusted cell layout on said display means.

20. The device according to claim 19, wherein said means for adjusting merges and unmerges cells.

21. The device according to claim 19, wherein said means for displaying the adjusted cell layout switches displays of hierarchical cell levels.

22. The device according to claim 19, wherein said means for adjusting expands and collapses hierarchical cells.

23. The device according to claim 14, wherein said display means displays physical and logical views of cells.

24. The device according to claim 14, wherein said control means automatically generates wire load models by interpolating the wire load model data base.

* * * * *